Sept. 25, 1951 H. L. LARSON 2,569,421
SEEDER AND FERTILIZER DISTRIBUTOR
Filed July 8, 1948 2 Sheets-Sheet 1
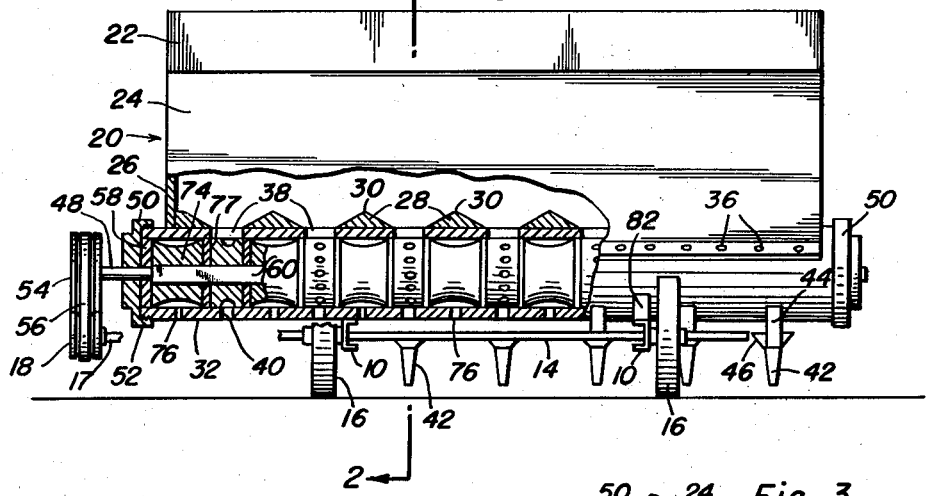
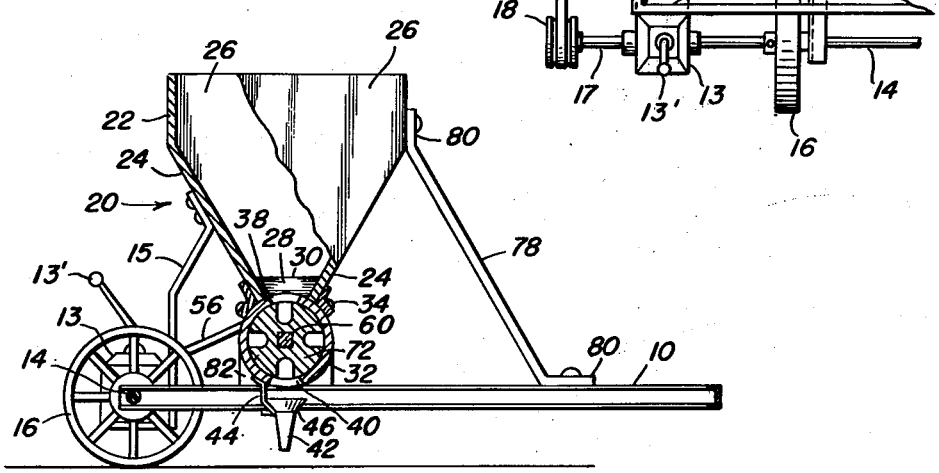
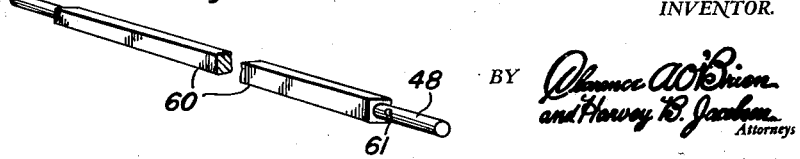
Hokan L. Larson
INVENTOR.

Sept. 25, 1951    H. L. LARSON    2,569,421
SEEDER AND FERTILIZER DISTRIBUTOR
Filed July 8, 1948    2 Sheets-Sheet 2

Hokan L. Larson
INVENTOR.

Patented Sept. 25, 1951

2,569,421

UNITED STATES PATENT OFFICE 2,569,421

SEEDER AND FERTILIZER DISTRIBUTOR

Hokan L. Larson, Fairview, Alberta, Canada, assignor of one-fourth to Alf M. Nordlie, Martin, N. Dak.

Application July 8, 1948, Serial No. 37,729

3 Claims. (Cl. 222—177)

This invention relates generally to agricultural implements, and more particularly to an implement for distributing seed and/or fertilizer and designed to be hauled by a tractor or otherwise.

A primary object of this invention is to provide a distributor of the type which will not clog during use, there being specific means provided to prevent fine material from collecting upon the bearing surfaces of the rotating parts of the distributor coming into direct contact with the material distributed.

Another object of this invention is to provide a seed and fertilizer distributor having a composite rotary feeder assembly, in which some of the elements are replaceable by elements of different forms, thereby allowing for adaptation of the implement to a distribution of different types of seed and different types of fertilizer and the like, the implement being ordinarily supplied to the user with sets of differently configurated feeder disks to be used in this composite rotary feeder assembly.

Still another object of this invention is to provide a device having the feature mentioned in the preceding object incorporated therewith in such a manner that the adaptation of the implement from one use to another by substitution of the aforementioned different configurated feeder disks may be accomplished in the field without the use of special tools and with a minimum expenditure of time and effort.

Still another object of this invention is to provide an implement of this character which may be powered either from the ground contacting wheels or from the power take-off of a tractor, without any considerable alteration being made in the structure of the main elements in the machine.

And a last object to be mentioned specifically is to provide a machine of this type which is relatively inexpensive and practicable to manufacture, which is simple, safe and convenient to operate, which will not readily become out of repair and which will require a minimum of maintenance, and which will give generally efficient and durable service.

With these objects definitely in view, this invention resides in certain novel features of construction, combination and arrangement of elements and portions as will be hereinafter described in the specification, particularly pointed out in the appended claims, and illustrated in the accompanying drawings which form a material part of this application, and in which:

Figure 1 is a rear end elevational view of the assembled machine, portions being broken away and the underlying portions being shown in elevation and in vertical section, in order to facilitate the illustration of this invention;

Figure 2 is a transverse vertical sectional view, taken substantially upon the plane including the line 2—2 in Figure 1, but showing the ground contacting wheels and a portion of the hopper in elevation;

Figure 3 is a fragmentary plan view showing the arrangement of a gear shift assembly on an axle carrying said ground-contacting wheels;

Figure 4 is a three dimensional broken view of a shaft carrying the composite feeder assembly;

Figure 12:
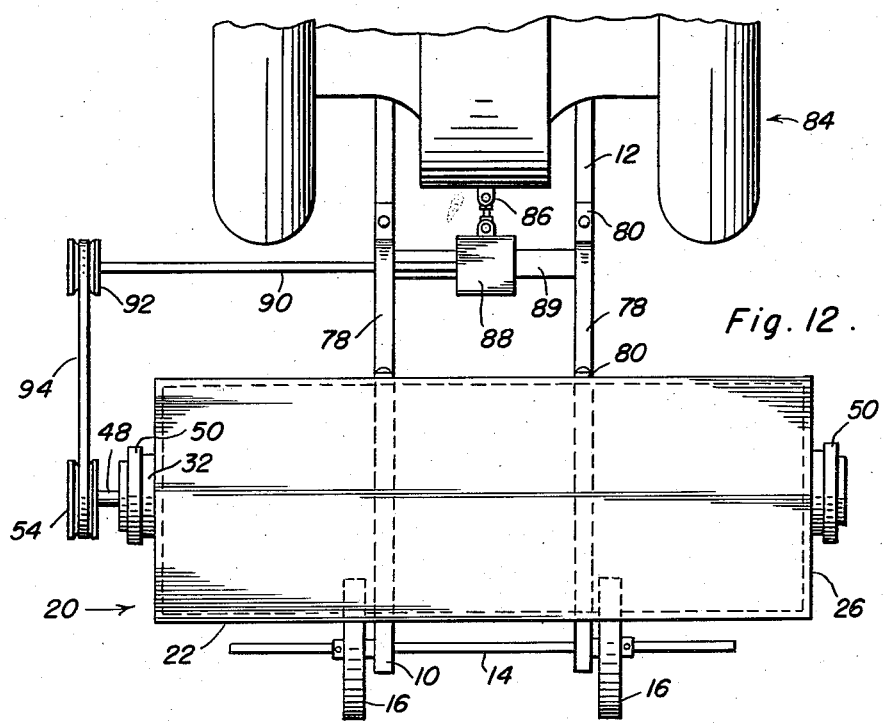
Figure 5:
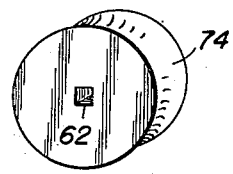
Figure 5 is a three dimensional view of what will be hereinafter referred to as a spacer disk.
Figure 6:
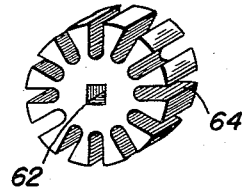
Figures 6, 7, 8 and 9 are three dimensional views of four different types of feeder disks which may be selectively assembled on the shaft illustrated in Figure 3 and used to adapt the machine for different purposes.
Figure 11:
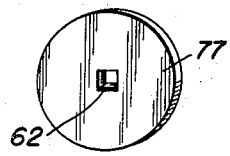

Figure 11 is a three dimensional view of the washer-like spacer disk insertable between the grooved spacer disks such as illustrated in Figure 5 and the feeder disks such as illustrated in Figures 6–9; and, Figure 12 is a top plan view of a slightly modified embodiment of this invention in which the power to drive the said composite rotary feeder assembly is derived from the power take-off of a tractor rather than from the ground contacting wheels.

Similar characters of reference designate similar or identical elements and portions throughout the specification and throughout the several views of the drawings.

Referring now to the drawings in detail, this implement includes a pair of longitudinal channel frame members 10, the forward ends 12 of which will be secured to a draw-bar or to the implement lift mechanism of a tractor or otherwise secured to any suitable members so that the implement may be drawn over the ground according to conventional practice. The details of the attachment of the frame 10 to the tractor is diagrammatically indicated in the drawing since the said details form no part of the essential elements of this invention.

An axle 14 is journalled on the channel frame members 10 near the rear ends thereof and the axle 14 carries ground-contacting wheels 16, which are adjustable longitudinally of the axle. In this embodiment of this invention, illustrated in all the figures with the exception of Figure 12, the power to drive the above mentioned composite rotary feeder assembly is derived from the ground contacting wheels 16, the axle 14 being extended in one direction and having a gear shift assembly 13 operatively associated therewith and supported by braces 15 and 15'. The gear shift assembly includes a hand control lever 13' and the driven shaft 17, which shaft carries a pulley 18.

A hopper generally indicated by the numeral 20 is comprised of vertical side members 22, sloping walls 24 and end walls 26, and it should be noted that the base of the hopper is provided with a plurality of dividers which are triangular in cross-section and are indicated in elevation in Figure 2 and in transverse vertical section in Figure 1 and identified by the numeral 28. The uppermost transverse ridges 30 of these dividers 28 and the sloping sides of these dividers are effective in regulating and facilitating the flow of material from the hopper into the distributor tube 32. This distributor tube is held in place by angles 34 which may be welded to the tube 32 and riveted as at 36 to the hopper, the exact method of securing the distributor tube to the hopper being thought immaterial in this application.

Inlet openings 38 on the top of the distributor tube 32 allow the material from the hopper to feed downwardly between the dividers 28 into the distributor tube, and outlet openings 40 on the bottom of the distributor tube are disposed directly vertically underneath the inlet openings 38. Feed pipes 42 are carried by the distributor tube 32, being mounted thereon by means of brackets 44 which may be welded or otherwise suitably secured to the distributor tube and similarly secured to funnel-shaped upper end portions 46 of the feed pipes 42.

Figure 7:
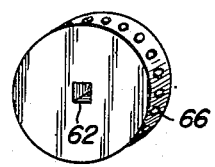
Figure 8:
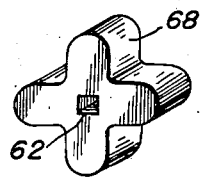
Figure 9:
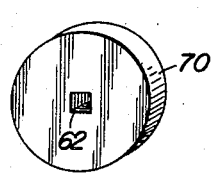
Figure 10:
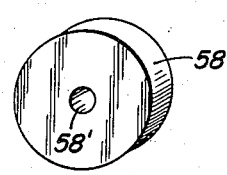
Figure 10 is a three dimensional view of an end plate inserted in the ends of the distributor tube.

A shaft 48 extends co-axially with the distributor tube 32 and is provided with bearings 50 of simple cap character, being internally screwed at 52 to engage similarly threaded ends of the distributor tube 32. The shaft 48 extends outwardly at one end beyond the corresponding bearing 50 and has rigidly secured thereto a pulley 54 which is driven by a belt 56 entrained around the aforementioned pulley 18 on the end of the driven shaft 17. Further bearing structure is provided in a pair of end plates 58, illustrated in Figures 1 and 10 and designed to fit snugly within the ends of the distributor tube 32, while supporting journal portions on the ends of the shaft 48. It will be noted that the major portion of the length of the shaft 48 is square in section, as indicated at 60, this square portion extending from one end plate 58 to the other, and the aforementioned composite feeder assembly is mounted upon this square portion 60. This assembly includes, aside from the shaft 48, a plurality of feeder disks which are illustrated in Figures 6, 7, 8 and 9 and each provided with a square hole 62 to receive the square portion 60 of the shaft 48. These feeder disks are made in several different shapes, the difference in configuration being limited to the peripheral portions thereof, as well illustrated in the drawings. The feeder disk 64 has a relatively large number of transverse recesses also extending radially of the disk, while the feeder disk in Figure 7 is illustrated as having a plurality of bores replacing the open recesses of the disk 64. A third form of feeder disk is substantially cruciform with the arms of the cross rounded at the outer ends. The disk 70 has a smooth periphery and may be used as an idler when the corresponding feed pipe 42 is not to be used. The shaft 48 has a bore 61 to receive a cotter key or similar device to hold the disks and other elements of the feeder assembly together when the assembly is being removed, as when the disks are to be changed. It may also be noted, in this connection, that another feeder disk form is illustrated in Figure 2 and indicated by the numeral 72, the number of recesses in the periphery of this last mentioned feeder disk being reduced from the number of recesses illustrated in the feeder disk 64 illustrated in Figure 6. As before stated, these disks are used selectively, ordinarily as a set of similar feeder disks mounted on the shaft 48, and still other forms may be provided in sets at the wish of the user of the implement.

A plurality of spacer disks 74, each of a width ordinarily wider than the feeder disks just described, are provided with a peripheral arcuate groove so that a space is provided between the contiguous portion of the distributor tube 42 and each spacer disk 74. Apertures 76 on the lower side of the distributor tube and registering with the grooves in the spacer disks 74 allow escape of dust and any matter which might accumulate and tend to clog the rotary feeder assembly. In this connection, particular attention is drawn to the provision of washer-like spacer disks 77 of wear resistant material which are inserted between adjacent sides of the feeder disks and the spacer disks 74, these washer-like disks serving as auxiliary bearing supports for intermediate portions of the shaft 48. All the said disks are formed with square apertures 62, but the end plates 58 will, of course, be formed with cylindrical bores to receive journal end portions of the shaft 48, as indicated at 58'.

A brace 78 having angularly disposed ends 80 for connection to the frame 10 and the vertical portions 22 of the hopper, together with bracket members 82 for mounting the distributor tube 32 upon the frame, complete this embodiment of the invention.

In a modified embodiment of this invention, a tractor, generally indicated by the numeral 84 and having a power take-off diagrammatically illustrated at 86 will be connected to suitable gear reduction mechanism in a housing 88 supported on a frame cross-member 89, suitable bearings being provided in connection therewith to support a drive shaft 90 which extends outwardly to the side of the machine adjacent the pulley 54, and a pulley 92 is mounted upon the end of this shaft 90 for cooperation with a belt 94 which is entrained around the pulleys 54 and 92 in this embodiment of the invention, it being understood that the belt 56 and the extension of the axle 14 may be deleted when the power is derived from the tractor. As before stated, the details of construction whereby power is obtained from the tractor is a matter of individual preferment and mechanical expediency, and this invention is concerned chiefly with improvements in the implement rather than the method and means of mounting and powering the same.

The operation of this invention will be clearly understood from the foregoing description of the mechanical details thereof, taken in connection with the drawings and the above recitation of the objects sought to be achieved by this invention. In recapitulation, it need only be added that material placed in the hopper 20 will feed through the inlet openings 38 onto the feeder disks and will be delivered through the outlet openings 40 into the funnel-shaped tops 46 of the feed pipes 42 for distribution onto the land. At the option of the user of the implement, sets of feeder disks of any one of the shapes illustrated in Figures 6, 7, 8 and 9 will be assembled on the shaft 48, in accordance with the material being distributed, it being understood that feeder disks such as illustrated at 68 will ordinarily be used to distribute coarser material than the material distributed by such feeder disks as illustrated at 66. It should be also carefully noted that the selection of the type of feeder disks to be used will also help to determine the amount or concentration of the material distributed on a given area. In the light of the foregoing description, it will now be clearly evident that the task of assembling a different set of feeder disks on the shaft 48 is a matter which can be accomplished in a few minutes, the cap-shaped bearing 50 being unscrewed from one end of the distributor tube 32, and the belt 56 or 94 being removed to allow the assembly to be withdrawn from the feeder tube. Other advantages will now be apparent to those familiar with the use of such implements.

Obviously, many minor variations may be made in the exact structural details and proportionment of the various elements of this invention without departure from the spirit and scope thereof, which scope should be determined only in accordance with the proper interpretation of the terminology used in the subjoined claims.

Having described the invention what is claimed as new is:

1. An implement for distributing seed and fertilizer comprising a frame having an axle with ground-contacting wheels, a hopper mounted on said frame, a distributor tube co-extensive with said hopper and secured to the lower side thereof, inlet openings at the top of said tube communicating with said hopper, outlet openings on the lower side of said distributor tube immediately beneath said inlet openings, a shaft slightly longer than said tube, cap bearings on the ends of said tube and mounting said shaft for rotation co-axially of said distributor tube, means to drive said shaft, said distributor tube with said shaft being spaced completely out of alignment to said wheels, a composite rotary feeder assembly including separable and interchangeable and replaceable rotary feeder disks peripherally recessed and mounted on said shaft to rotate therewith between said inlet and outlet openings, peripherally grooved spacer disks on said shaft and between said feeder disks, and washer-like spacer disks of wear resistant material on said shaft between said feeder disks and said grooved spacer disks comprising bearing members for the shaft auxiliary to said cap bearings.

2. An implement according to claim 1 and wherein said washer-like spacer disks and said grooved spacer disks and said feeder disks have non-circular transverse apertures at the center thereof, and said shaft is similarly shaped in cross-section throughout a major portion of its length so that all said disks are rotated with the shaft during the operation of the implement.

3. An implement for distributing seed and fertilizer comprising a frame having an axle with ground-contacting wheels, a hopper mounted on said frame, a distributor tube co-extensive with said hopper and secured to the lower side thereof, inlet openings at the top of said tube communicating with said hopper, outlet openings on the lower side of said distributor tube immediately beneath said inlet openings, a shaft slightly longer than said tube, cap bearings on the ends of said tube and mounting said shaft for rotation coaxially of said distributor tube, means to drive said shaft, said distributor tube with said shaft being spaced completely out of alignment with said wheels, a composite rotary feeder assembly including separable and interchangeable and replaceable rotary feeder disks peripherally recessed and mounted on said shaft to rotate therewith between said inlet and outlet openings, spacer disks on said shaft and between said feeder disks, and washer-like spacer disks of wear resistant material on said shaft between said feeder disks and grooved spacer disks comprising bearing members for the shaft auxiliary to said cap bearings, said first mentioned spacer disks having peripheral arcuate grooves, said shaft and feeder assembly being insertable into said tube by movement thereof axially of the tube, and said tube having apertures on its lower side registering with said arcuate grooves to allow escape of dust and preventing clogging and undue wear.

HOKAN L. LARSON.

REFERENCES CITED

The following references are of record in the file of this patent:

UNITED STATES PATENTS

| Number | Name | Date |
|---|---|---|
| 290,538 | Cook | Dec. 18, 1883 |
| 441,791 | Davis | Dec. 2, 1890 |
| 713,681 | Pickorn | Nov. 18, 1902 |
| 818,396 | Torres | Apr. 17, 1906 |
| 1,213,830 | Boon | Jan. 30, 1917 |
| 1,284,131 | Murdick | Nov. 5, 1918 |
| 1,297,863 | King | Mar. 18, 1919 |
| 1,573,493 | Heyd | Feb. 16, 1926 |
| 1,758,607 | Johnson | May 13, 1930 |
| 1,928,908 | Palmer | Oct. 3, 1933 |
| 2,126,425 | Thompson et al. | Aug. 9, 1938 |